A. HALL.
BALANCING REVOLVING CUTTER-HEADS.
No. 183,260. Patented Oct. 17, 1876.
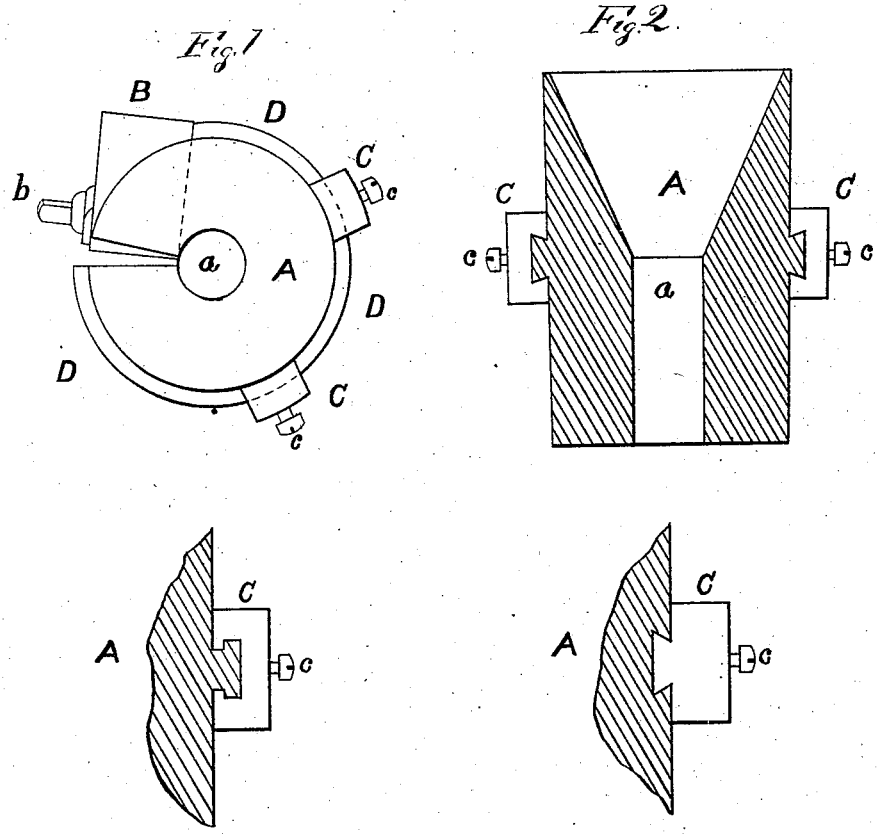
Witnesses
H. S. Cort
E. R. Park
Inventor
Albert Hall
by Webster Park
his attorney.

UNITED STATES PATENT OFFICE.

ALBERT HALL, OF WILLINGTON, CONNECTICUT.

IMPROVEMENT IN BALANCING REVOLVING CUTTER-HEADS.

Specification forming part of Letters Patent No. 183,260, dated October 17, 1876; application filed April 19, 1876.

*To all whom it may concern:*

Be it known that I, ALBERT HALL, of Willington, in Tolland county and State of Connecticut, have invented certain Improvements in Revolving Cutter-Heads or Chucks, of which the following is a specification:

My invention relates to that kind of hollow heads or chucks which are run with great velocity, and upon which balance-weights have been necessarily used to counterbalance the weight of the cutter, as upon those chucks which are used for making spools and other similar purposes; and it consists in an improved and entirely safe method of securing the balance-weights upon the chuck, and also so that the same weights may be used to balance cutters of different weight, by simply changing the position of the balance-weights upon the chuck.

In the accompanying drawings, Figures 1 and 2 represent the front end and a longitudinal section of one of that kind of chucks which are used for turning spools, showing two of my balance-weights in position upon it. The small figures represent a section of a portion of the chuck with the balance-weight in position, showing the different forms of the slides by which the weights are secured upon the chuck.

A represents the ordinary chuck, having a hollow conical mouth, upon the side of which is set the cutter B, which is held by the set-screw $b$, $a$ being the hole into which the finished spool passes, all these parts being of the ordinary construction. C C are my improved balance-weights, which are securely confined upon the chuck by means of being dovetailed upon the annular flange D, which is made around the chuck, as shown in the drawing. Instead of the flange D, an annular groove may be used, into which the weight is dovetailed in the same manner; or the form of the groove may be varied, if desired, the object of my invention being to keep the weights safe and secure upon the chuck by means of the overhanging edges upon the chuck. $c\ c$ are set-screws inserted into the top of the weights to keep them in the place to which they may be adjusted, it being evident that when two weights are used, by placing them diametrically opposite each other, they have no influence to balance the cutter B; but as they are moved around toward each other their influence increases until they meet opposite the cutter.

This improvement affords a ready and easy means of balancing cutters of various weight, and dispenses with the ordinary inconvenient and unsafe method of screwing pieces of iron upon and into the chucks, which frequently become loosened by the jar or broken by rough usage, and are thrown off with great violence to the serious injury of persons or property.

I am aware of the patent of H. B. Smith, dated July 6, 1858, and do not wish to claim, broadly, the use of adjustable balance-weights secured upon the chuck by screws inserted through them into the chuck, or of plugs screwing back and forth in the chuck in the manner shown in said Smith's patent; but I do claim as my invention—

The combination, with the hollow chuck A and cutter B, of two or more balance-weights, C C, when these balance-weights are secured upon the periphery of the chuck by the annular dovetailed groove or flange D, so as to slide freely upon its periphery, and to be adjusted in their required positions by the set-screws $c\ c$, substantially as and for the purposes herein set forth.

ALBERT HALL.

Witnesses:
CHARLES N. ALLEN,
ORIGIN HALL.